United States Patent
Ganster

(10) Patent No.: US 10,755,551 B2
(45) Date of Patent: *Aug. 25, 2020

(54) DYNAMICALLY MANAGING PREMISES MANAGEMENT TRAFFIC

(71) Applicant: Comcast Cable Communications, LLC, Philadelphia, PA (US)

(72) Inventor: Christopher Ganster, Villanova, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/983,891

(22) Filed: May 18, 2018

(65) Prior Publication Data

US 2019/0066482 A1    Feb. 28, 2019

Related U.S. Application Data

(63) Continuation of application No. 15/402,785, filed on Jan. 10, 2017, now Pat. No. 10,014,972.

(51) Int. Cl.
*G08B 25/00* (2006.01)
*H04L 12/28* (2006.01)

(52) U.S. Cl.
CPC ......... *G08B 25/007* (2013.01); *H04L 12/28* (2013.01); *H04L 12/2803* (2013.01)

(58) Field of Classification Search
CPC ...... G08B 19/00; G08B 19/005; G08B 21/18; G08B 21/182; G08B 1/00; G08B 13/00; G08B 15/00; G08B 15/02; G08B 25/00; G08B 25/007; G08B 25/009; G08B 25/01; G08B 25/014; H04L 12/2803; H04L 12/2823; H04L 12/2825; H04L 12/2827; H04L 41/5003; H04L 41/5032; H04L 41/5041; H04L 41/5045; H04L 41/5048; H04L 41/5054

See application file for complete search history.

(56) References Cited

U.S. PATENT DOCUMENTS

| | | | |
|---|---|---|---|
| 6,349,325 B1 | 2/2002 | Newcombe et al. | |
| 6,934,258 B1 | 8/2005 | Smith et al. | |
| 7,436,844 B2 * | 10/2008 | Wang | H04L 41/5003 370/412 |
| 7,469,291 B2 * | 12/2008 | Hammell | G06F 21/41 709/225 |
| 9,454,893 B1 | 9/2016 | Warren et al. | |
| 2003/0217091 A1 | 11/2003 | Echigo et al. | |
| 2007/0008099 A1 | 1/2007 | Kimmel et al. | |
| 2008/0019371 A1 | 1/2008 | Anschutz et al. | |
| 2009/0074184 A1 | 3/2009 | Baum et al. | |
| 2012/0235579 A1 | 9/2012 | Chemel et al. | |

(Continued)

*Primary Examiner* — Van T Trieu
(74) *Attorney, Agent, or Firm* — BakerHostetler

(57) ABSTRACT

Systems and methods for dynamic communication and control of devices associated with a premises are disclosed. The systems and methods may include receiving first status information by a device associated with a premises; determining a priority condition based at least on the first status information; transmitting the first status information including a first differentiated services code point indicative of the priority condition; and transmitting second status information including a second differentiated services code point indicative of the normal condition.

20 Claims, 9 Drawing Sheets

(56) References Cited

U.S. PATENT DOCUMENTS

2016/0380842 A1* 12/2016 Cordray ................. H04L 41/20
                                                    709/222
2017/0041752 A1*  2/2017 Baek ..................... H04W 4/023
2017/0068419 A1   3/2017 Sundermeyer et al.

* cited by examiner

DYNAMICALLY MANAGING PREMISES MANAGEMENT TRAFFIC

CROSS REFERENCE TO RELATED APPLICATION

This application is a continuation of U.S. patent application Ser. No. 15/402,785, filed Jan. 10, 2017, issued as U.S. Pat. No. 10,014,972 on Jul. 3, 2018.

BACKGROUND

Premises management systems may capture and transmit information such as security video and status information relating to the managed premises to enable remote monitoring and control of the premises. Existing solutions for capturing and transmitting such information often consumes significant network (e.g., Wi-Fi) bandwidth and resources. As an example, utilization of network resources for frequent or continuous transmission of status information and/or data may cause interruptions in other services using the network, such as content transmission from online service provider. Additionally, some premises management systems require modification to the captured data, which negatively affects the user experience. These and other shortcomings are addressed in this disclosure.

SUMMARY

In one aspect, the present disclosure provides systems and methods for dynamic communication and control of premises devices such as video capture devices (e.g., cameras), sensors, and the like. As an example, a configuration service may be configured to communicate with one or more premises devices at boot up and/or on a defined interval to enable/disable status capture (e.g., video recording), define location to post data such as video data, authenticate information such as users or devices on the network, and determine data format/settings.

One or more premises devices may be configured to determine status information associated with a premises. A priority condition may be determined based at least on the status information. As such, the status information may be transmitted with an indication of the priority condition. For example, a first marker may be used to indicate the priority condition when a premise management system is active or armed and a second marker may be used to indicate the priority condition when the premises management system is inactive or disarmed. Such markers may be included in transmissions (e.g., packets) sent from the premises devices and/or premises management system. As a further example, a differentiated services code point (DSCP) may be configured to indicate the priority condition. As a further example, a DSCP may have one or more values that indicate a normal condition and one or more values that indicate a priority condition. Other conditions and status indicators may be represented by a value of the DSCP. In certain aspects, the configuration service may configure one or more premises device to apply particular DSCP values to transmissions (e.g., packets) to indicate various conditions and/or status indicators.

Additional advantages will be set forth in part in the description which follows or may be learned by practice. It is to be understood that both the foregoing general description and the following detailed description are examples and explanatory only and are not restrictive.

BRIEF DESCRIPTION OF THE DRAWINGS

The following drawings show generally, by way of example, but not by way of limitation, various examples discussed in the present disclosure. In the drawings.

DETAILED DESCRIPTION

A premises management system may include one or more premises devices such as sensors configured to determine status information associated with a premises. The status information may include video, audio, and/or alphanumeric information relating to the premise, for example. Certain status information may have a higher priority that other status information. For example, an alarm condition at a premises may indicate that there is a security or safety breach affecting the premise. As such, status information associated with the alarm condition may have a higher priority than status information associated with a non-alarm condition. As a further example, priority may be dependent on a state (e.g., active, inactive, armed, disarmed, etc.) of a premises management system associated with the premises devices.

A priority condition (e.g., high priority) may be determined based at least on the status information and/or one or more priority rules. Priority rules may be customized and may be premises-specific, user-specific, or may be applied generically. The priority condition may be used to control an aspect of transmission of information from the premises. For example, status information may be transmitted with an indication of the priority condition. As another example, a differentiated services code point (DSCP) may be configured to indicate the priority condition. As a further, a DSCP may have one or more values that indicate a normal priority and one or more values that indicate a priority condition at the premises. Other conditions and status indicators may be represented by a value of the DSCP. In certain aspects, the configuration service may configure one or more premises device to apply particular DSCP values to transmissions (e.g., packets) to indicate various conditions and/or status indicators.

Figure 1:
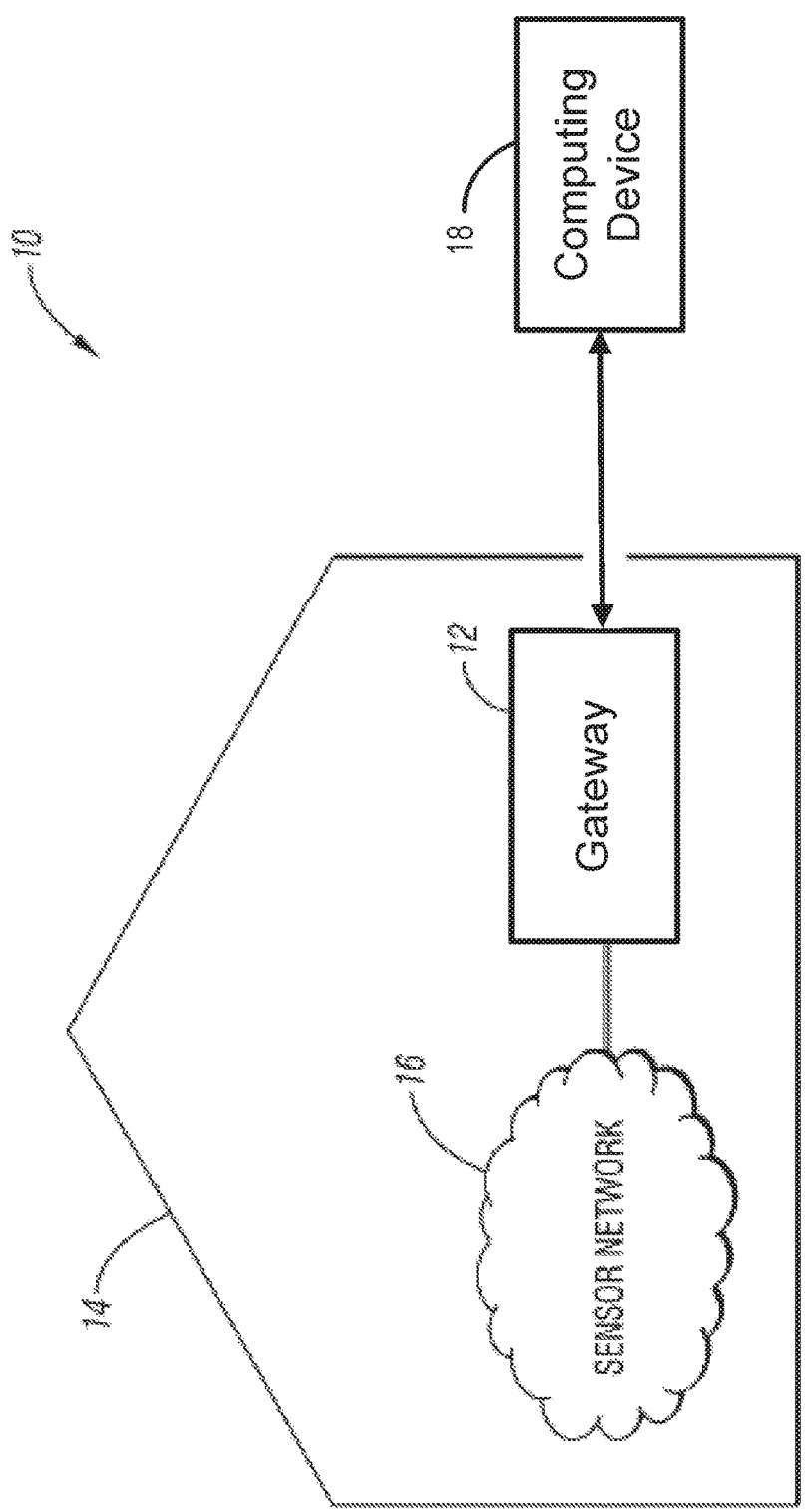
FIG. 1 shows an example premises security system.

FIG. 1 shows various aspects of an example network in which the present methods and systems may operate. Those skilled in the art will appreciate that present methods may be used in systems that employ both digital and analog equipment. One skilled in the art will appreciate that provided herein is a functional description and that the respective functions may be performed by software, hardware, or a combination of software and hardware.

As shown, a premises management system 10 may comprise a gateway 12 disposed at a premises 14. The gateway 12 may be configured to facilitate communications between a sensor network 16 and a computing device 18 via a communication network such as a private or public network (e.g., Internet) using one or more protocols (e.g., Internet protocol). The gateway 12 may be or comprise a computing device that allows one or more other devices in the premises 14 to communicate with the computing device 18 and other devices beyond the computing device 18. The gateway 12 may be or comprise a wireless router/terminal, set-top box (STB), digital video recorder (DVR), computer server, or any other desired computing device. The gateway 12 may also include (not shown) local network interfaces to provide communication signals to other devices in the home (e.g., user devices), such as televisions, STBs, personal computers, laptop computers, wireless devices (wireless laptops and netbooks, mobile phones, mobile televisions, personal digital assistants (PDA), etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

The sensor network 16 may comprise one or more premises device such as video capture devices and premise management sensors. The sensor network 16 may comprise an electronic device such as a computer, a sensor, a capture device, a smartphone, a laptop, a tablet, a set top box, or other device capable of communicating with the computing device 18. The sensor network 16 may be configured to communicate, directly or via the gateway 12, with the computing device 18 and/or other network devices via a network. The sensor network 16 may be configured as a premises management sensor. Although a sensor may be configured to receive or "sense" information such as status information, the sensor may alternatively or additionally be configured as a control mechanism or transmitter. As such, premises management sensors may collect status information indicative of one or more conditions at the premises 14. The premises management sensors may control one or more home security or home automation features. The premises management sensors may transmits commands, control information, and/or status information, for example, to various connected devices such as the gateway 12 or a connected home appliance.

The sensor network 16 may be or comprise a video capture device such as a camera or image sensor. The configurations of the sensor network 16 may be managed in response to settings and/or other information received from the computing device 18 or other devices. The video segments may be transmitted to the computing device 18 in a periodic fashion, thereby minimizing burden on network resources such as bandwidth. The computing device 18 may process the received video segments and distribute the video segments to the appropriate video store. Once the video clips are stored, one or more recipient device s (not shown), such as video client applications, may access or received the video segments for playback.

The sensor network 16 may be configured to determine status information associated with the premises 14. The status information may include video, audio, and/or alphanumeric information relating to the premise, for example. Certain status information may have a higher priority that other status information. For example, an alarm condition at the premises 14 may indicate that there is a security or safety breach affecting the premise. As such, status information associated with the alarm condition may have a higher priority than status information associated with a non-alarm condition. As another example, status information indicating an alarm at a door or window (e.g., break-in) may be prioritized over status information indicating a request for streaming content. As another example, status information associated with a personal emergency response system (PERS) or monitored connected health devices (e.g., heart monitor, wearable device, etc.) may be associated with the highest priority. As another example, status information indicating entry at a door or window of the premises may be prioritized over non-alarm communications such as home automation control over lighting at the premises, for example. As a further example, status information may be prioritized (e.g., normal, high priority, etc.) based at least on a state of a premises management system, (e.g., sensor network 16, security system, home automation system, etc.). As such, when the premises management system is armed or active, a first marker may be used to indicate a higher priority condition than a normal condition. When the premises management system, is disarmed or inactive, a second marker may be used to indicate a normal condition.

A priority condition (e.g., higher priority than a normal/default condition) may be determined based at least on the status information and/or one or more priority rules. Priority rules may be customized and may be premises-specific, user-specific, or may be applied generically. The priority condition may be used to control an aspect of transmission of information from the premises. For example, status information may be transmitted with an indication of the priority condition. As another example, a differentiated services code point (DSCP) may be configured to indicate the priority condition. As a further, a DSCP may have one or more values that indicate a normal priority and one or more values that indicate a priority condition. Other conditions and status indicators may be represented by a value of the DSCP. In certain aspects, the configuration service may configure one or more premises device to apply particular DSCP values to transmissions (e.g., packets) to indicate various conditions and/or status indicators.

A marker such as a DSCP value may indicate a level of network traffic processing priority. For example, a default marker value may be 000 000 and may indicate a best effort traffic management over a network. As such, a network device (e.g., router) may implement its best efforts to pass a packet with this default service level. As a further example, other marker values such as 101 110 may indicate a higher level of service as compared to the best effort. Such a higher level of service (e.g., priority condition) may include expedited forwarding or assured forwarding. Information (e.g., packets) marked with higher levels of service (e.g., priority) are more likely to be processed through a network device without packet loss during congestion, as compared to default level packets.

Mapping of markers such as DSCP values to a particular condition (e.g., alarm condition, priority condition, non-alarm condition, active/armed condition, disarmed/inactive condition, etc.) may be processed and/or stored locally to the premises 14, such as at gateway 12, and/or remote from the premise 14, such as computing device 18, or other device or service. As such, the sensor network 16 may receive such mapping via one or more of a push and pull communication. For example, the sensor network 16 may receive mapping information associated with the markings as a pushed configuration update. As a further example, the sensor network 16 may receive the mapping information in response to a request. Once the mapping information is received at the sensor network 16, the sensor network 16 may use the mapping information to selectively mark transmissions such as outgoing packets (e.g., status information. Information marking may be applied to IP packets, as described, or other kinds of packets or units of data, such as TCP, FTP, flows, datagrams, frames, or other data units or capsules.

Figure 2:
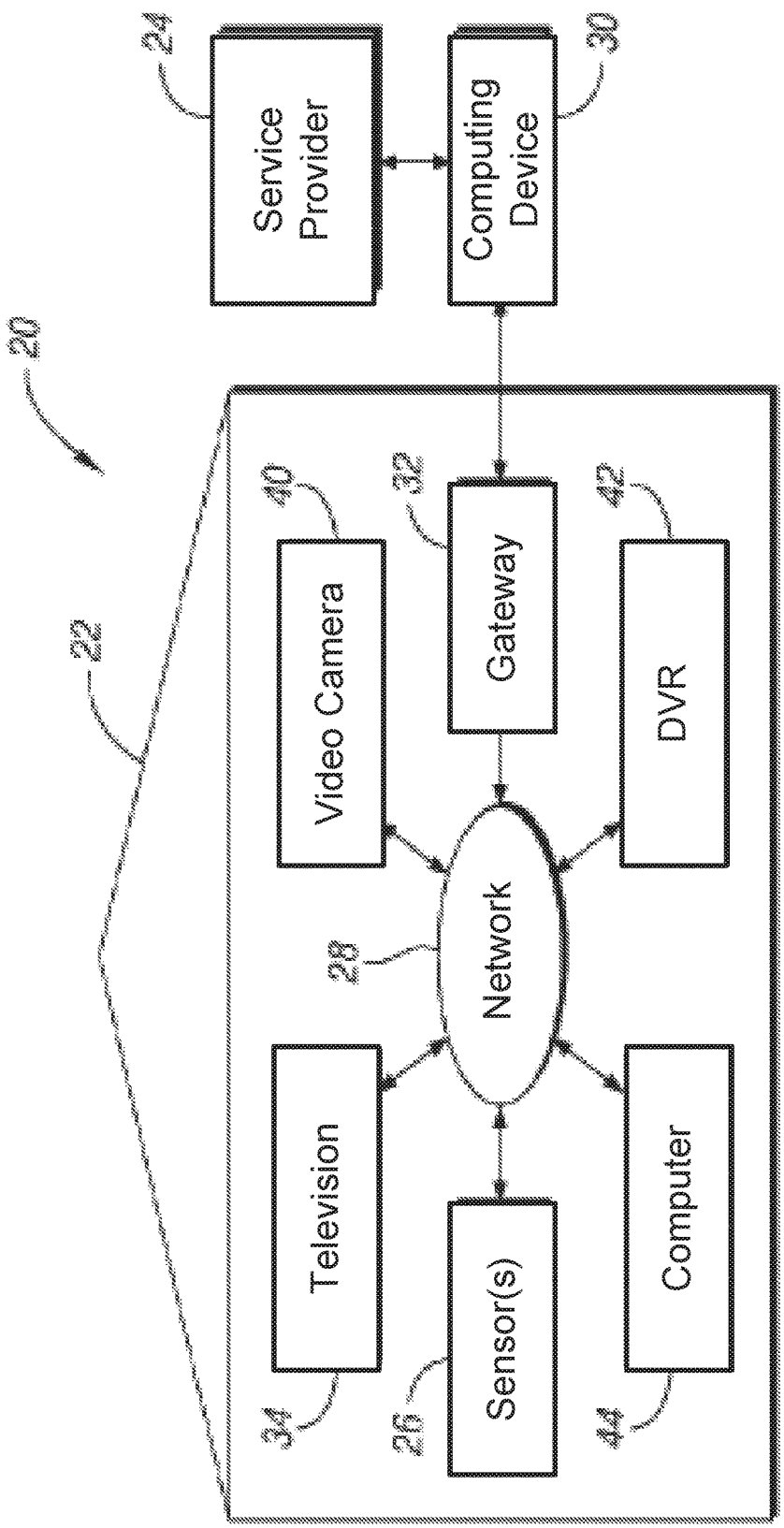
FIG. 2 shows an example building security system.

FIG. 2 shows a premises management system 20 that may be configured to support surveillance and services, such as security and monitoring services, for a home, office, or other premises 22. A management service provider 24, such as a central monitoring station, may communicate with the premises 22 to support any number of building management processes (e.g., security, home automation, etc.). The system 20 may support management processes that rely on one or more sensors 26, such as audio, video, temperature, air quality, and presence sensors, to monitor related conditions within the premises 22. The sensors 26 may be examples implementations of the sensor network 16 described with regards to FIG. 1. Data regarding the monitored conditions may be communicated over a network 28 to a computing device 30. While FIG. 2 shows an aspect of the disclosure in connection with a building, the systems and methods of the present disclosure are not limited to implementation with a building or facility.

The network 28 may be any type of wireless or wireline network such as, but not limited, to a high speed data network used by content service providers to support television content transmissions and/or other types of networks used to support high speed data transmission and signaling. The network 28 may include one or more network devices configured to facilitate the transmission of information based on service levels and network polices. Such service levels may include priority processing of information, wherein certain information is processed with a high priority than other information, thereby minimizing a risk of dropping information during congestion on the network 28. These service levels may be implemented based at least on information markers (e.g., DSCP) indicating a particular service level or priority for processing. The network 28 may be used to support periodic and/or continuous transmission of data from the sensors 26 regardless of whether the monitored conditions have changed. This data may be transmitted to the computing device 30 for further processing.

The computing device 30 may assess the need to instigate an alarm from the information provided by the sensors 26. A gateway 32, for example a set-top box (STB), cable modem, router, and/or other service provider/supported device within the building may be used to communicate the data collected by the sensors 26 regarding the conditions in the premises 22 to the computing device 30. The gateway 32 may be the same or similar to the gateway 12 described with respect to FIG. 1. The gateway 32 encapsulates or otherwise packages the data provided by the sensors 26 for transmission to the computing device 30 without performing management-related processing.

The computing device 30 may be configured to monitor conditions in a number of premises 22 and to separately instigate alarms in each premises 22. Each premises 22 may similarly transmit sensed conditions to the computing device 30 for processing. Because the computing device 30 is used instead of the gateway 32 to assess the need for the alarm, the computing device 30 is updated to support updated functionality in each of the premises 22 without requiring significant updates in the buildings. This may limit the cost of updates when the service provider 24 provides additional services to customers.

The computing device 30 may include any number of applications that perform any number of security processes, such as, but not limited to, those associated with person monitoring, video monitoring, audio monitoring, medical monitoring, energy management, and/or some combination thereof.

For example, monitoring may include monitoring for movements within the premises 22 and generating an alarm if movements are not determined over a period of time. Video monitoring may use facial recognition or other techniques to assess whether intruders are within the premises 22. For example, a video camera 40 may be included to capture video from within the premises 22, and a DVR 42 may begin recording video when presence detectors sense a presence within a room while the building security system 20 is armed. This video may be transmitted to the computing device 30 for intruder analysis and/or alarm verification. Similarly, audio monitoring may operate with the video monitoring to support related security assessments. The information from any sensor 26 may be used with information from the other sensors 26 to assess the need for an alarm.

In certain aspects, security-related processing associated with triggering the alarms is performed by the computing device 30. This alleviates processing demands on the gateway 32. If changes or other updates to the security process are needed, i.e., to support new functionality, home devices, sensors, etc., the computing device 30 may be updated instead of requiring significant updates to the gateway 32.

An alarm condition at a premises may indicate that there is a security or safety breach affecting the premise. As such, status information associated with the alarm condition may have a higher priority (e.g., importance) than status information associated with a non-alarm condition. The priority associated with status information and/or alarm conditions may be used to control an aspect of transmission of information from the premises. For example, status information may be transmitted with an indication of the priority. As another example, a differentiated services code point (DSCP) may be configured to indicate the priority. As a further, a DSCP may have one or more values that indicate a normal priority and one or more values that indicate a high priority. Other conditions and status indicators may be represented by a value of the DSCP. As such, when recipient devices (e.g., network devices) receive information including the indication of priority, the recipient device may execute and/or modify a particular operation based on the indication of priority.

As an example, in the context of video security systems, an alarm condition at a premises may be detected by one or more sensors 26. Information associated with the alarm condition may be transmitted via a network to a user or monitoring service. Under default transmission conditions, congestion on the network may inhibit the alarm condition from reaching the user on a timely basis due to latency or information loss. However, the information relating to the alarm condition may be marked to indicate that the underlying information (e.g., payload) is associated with an alarm condition and therefore should be processed with a high level of service (e.g., priority). Information bearing this priority marker may be processed by network devices to minimize information loss and latency, while default traffic is processed with a lower level of service. Accordingly, conditions at the premises may be transmitted based on an importance of the particular condition. Conditional hierarchies and tables may be pre-determined for a particular premises, user, region, account, market, or may be applied at-large.

In one aspect of the disclosure, a system may be configured to provide services such as network-related services.

Figure 3A:
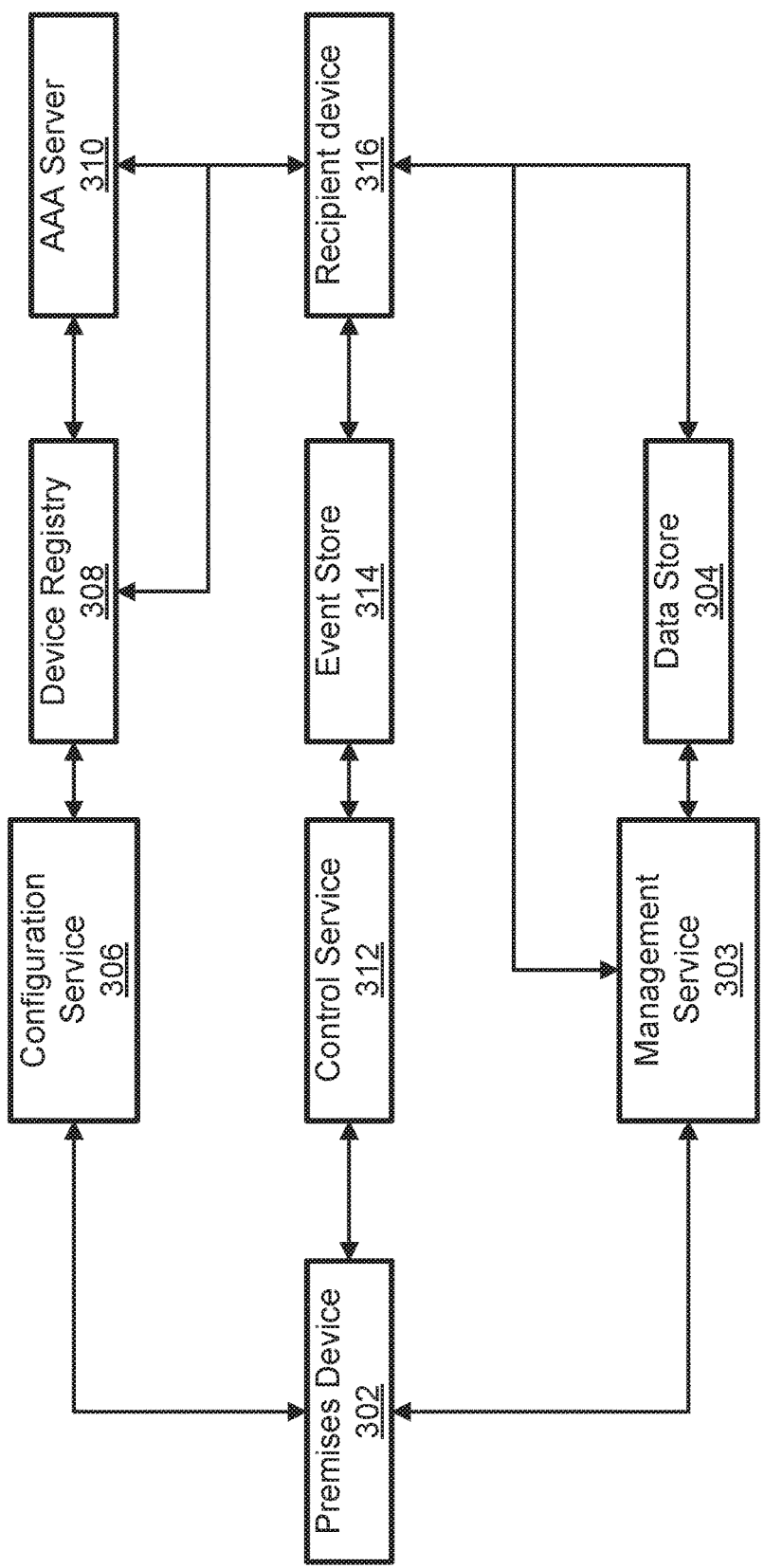
FIG. 3A is a block diagram of an example system and network.
Figure 3B:
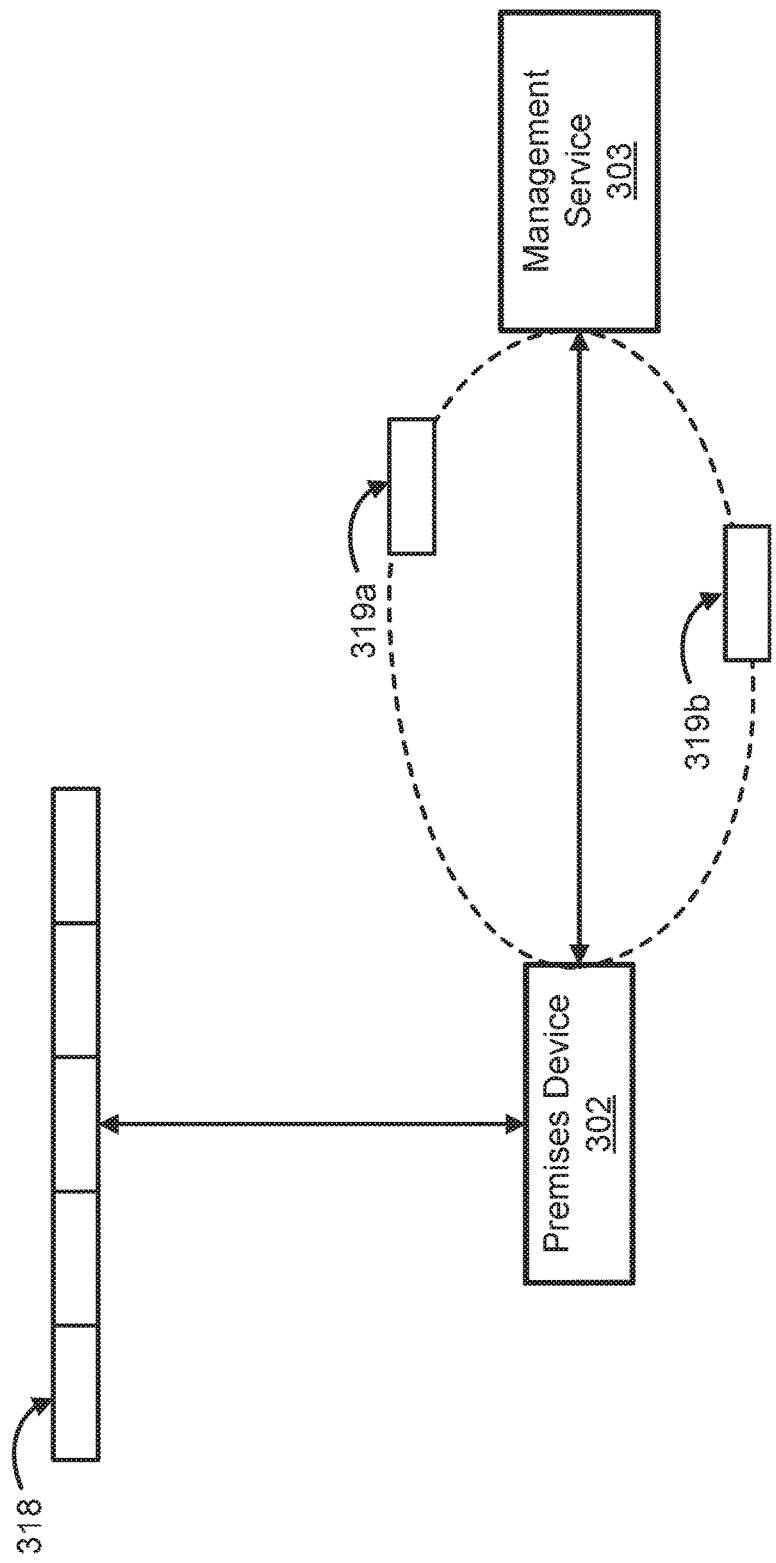
FIG. 3B is a block diagram of an example system and network showing transmission of video segment of a captured video stream.

FIGS. 3A-3B show various aspects of an example environment in which the present methods and systems may operate. The present disclosure is relevant to systems and methods for dynamic communication and control of premises devices 302 such as video capture devices (e.g., cameras), sensors, and the like. As an example, a configuration service 306 may be configured to communicate with one or more premises devices 302 at boot up, on a defined interval, and/or persistent connection to enable/disable one or more management services. The configuration service 306 may provide configuration information including one or more values of a packet marker (e.g., DSCP value) The configuration information may comprise information that defines a location to post data such as video data and/or sensor data.

As an example, the premises device 302 such as a sensor may be configured via the configuration service 306 to transmit packets of information to a management service 303. The transmission of such packets may include the marking of each of the packets with a packet marker such as a DSCP. The packet marker may indicate a particular condition, priority, importance, and the like associated with the underlying information (e.g., payload).

The management service 303 may process the received information (e.g., packets) and may execute one or more operations based at least on the packet markers. As another example, the management service 303 may facilitate the storage of video segments under a default or normal condition, as represented by the packet marker. However, a packet marker indicating an alarm condition may cause the management service 303 to alert a user or recipient device 316. One or more recipient devices 316 may receive an alert that an alarm condition is occurring. Additionally or alternatively, the packet marker may be received by intervening devices such as network devices that are configured to manage network traffic based at least on the packet markers.

The management service 303 may comprise hardware and/or software configured to facilitate the access or receipt of information such as video segments from one or more premises device 302 associated with a premises. As an example, the management service 303 may be configured to communicate with the premises devices 302 via an IP network using standard protocols, as appreciated by one of skill in the art. As a further example, the premises devices 302 may be configured to transmit (e.g., push) information such as a video segments in a period manner. As such, the premises devices 302 may capture video continuously and may cache segments of video having a predetermined length of time. The video segments may be transmitted periodically to the management service 303 for storage external to the premises. As an example, the management service 303 may process the received information and may cause the information to be stored, for example via the video store 304. Various storage mechanisms may be used. For example, the management service 303 may facilitate the storage of video segments in multiple locations for geo-redundancy.

The configuration service 306 may comprise hardware and/or software configured to facilitate configuration of settings relating to the operation of one or more premises devices 302. As an example, the configuration service 306 access or receives a requests from the premise devices 302 associated with a configuration settings and returns the configuration for the particular premise device 302.

The premises device 302 may receive or access configuration information using various protocols, conventions, and specifications. As an example, the premises device 302 may request configuration information using an HTTP GET. Such a request is shown below as Table 1:

TABLE 1

> GET /config/1234567890AB
> Host: config-cvr.g.hostaddress.com
> Connection: close
> User-Agent: Sercomm iCamera2-C V3.0.02.35 1234567890AB
> X-Request-Id: 944A0C203683-001-20160225073739
> X-Seq: 55
> Authorization: Basic 0987654321FEDCBA
>
< HTTP/1.1 200 OK
< Content-Type: application/xml
< Request-Time: 22
< Content-Length: 1511

As shown in Table 1, the request for configuration information may include an identifier or designation indicating a path (e.g., /config/1234567890AB) associated with the configuration information for the particular premises device 302. The request may include a host identifier such as config-cvr.g.hostaddress.com indicating an address of the service host. The request may include an indication of the connection status (e.g., Connection: close), The request for configuration information may include one or more identifiers relating of the source of the request, such as the premises device 302. The identifiers may include make, model, firmware version, device identifier (e.g., cameraId) such as shown in Table 1 as "User-Agent: Sercomm iCamera2-C V3.0.02.35 1234567890AB," where make is Sercomm, model is iCamera2-C, firmware version is V3.0.02.35, and device identifier is 1234567890AB. Other identifiers may also be used, such as a request identifier that may be unique for each request (e.g., X-Request-Id: 944A0C203683-001-20160225073739).

Communications between the premises device 302 and the configuration service, or other services, may be logged. As an example, each attempted request for configuration information may be tracked using an incremental field such as "X-Seq: 55," shown in Table 1. As a further example, the attempted request log may be set to zero when the premises device 302 is restarted.

The request for configuration information may include authorization information such as an authorization header (e.g., Authorization: Basic 0987654321FEDCBA), which may be based on the standard or protocol being implemented for the request. The request for configuration information may include additional information such as receipt confirmation (e.g., HTTP/1.1 200 OK), content type (e.g., Content-Type: application/xml), request process time (e.g., Request-Time: 22), response content length (e.g., Content-Length: 1511 (in bytes)), and the like.

The recipient (e.g., configuration service 306) of the request for configuration information may process the request and provide a response. As an example, the response may include configuration information such as device settings and may be transmitted using various protocols, conventions, and specifications. The configuration service 306 may be configured to communicate directly or indirectly (e.g., via a network gateway) with one or more of the premises devices 302 to access settings relating to the premises devices 302 and/or to update the settings for operation of the premises devices 302. The settings may be provided in various data structures and formats, including, and may include parameters such as activation/deactivation, light sensitivity, firmware, storage location, captured video format, and captured video duration.

Settings provided via the configuration service 306 may also include activation of network video storage (e.g., cloud camera recording). As such, network video storage may be a feature that is activated and deactivated for one or more devices such as the premises device 302.

Light sensitivity (e.g., Lux) of the premises device 302 may be adjusted using the configuration information. As an example, by adjusting the day-to-night and night-to-day settings, the sensitivity settings of the premises device 302 may be configured for certain conditions or transitions (e.g., day or night mode). As a further example, switching the premises device 302 from day to night mode may include activating infrared lights or sensors and triggering the infrared cut filter to enable video capture under dark conditions.

One or more services such as the configuration service 306 may manage firmware rollouts and updates including defining a location for accessing certain firmware versions. As an example, the configuration information transmitted to the premises device 302 may include a URL indicating the location of firmware for updating the premises device 302. Firmware Force: By setting this to true or false, Comcast may control the rollout of firmware upgrades to the camera, as well as, dictate the location of the firmware.

The configuration information may include information relating to the capture and storage of video. The configuration information may include parameters associated with audio, group of pictures (GOP) formatting, frames per second, resolution, and bit rates of video captured via the premises device or other device.

The configuration information may include a path (e.g., URL) indicating the destination that the premises device 302 should post video segments. The path may be associated with a network storage such as the video store 304 or may be a path associated with the management service 303 for managing to storage of the video segments. The configuration information may also include a segment format and segment duration (e.g., size). Segment formats may include MPEG2-TS or mp4 and other video formats now known or later developed.

The configuration service 306 may be in communication with a device registry 308 to determine the number and identification of the premises devices 302 associated with a particular premises and/or user (e.g., customer). The device registry 308 may include user identifiers or premises identifiers and may associate device information with the user or premises identifiers. For example, device information may include a make, a model, a firmware version, and/or a device identifier for each premises device 302 associated with a particular user or premises. As a further example, the configuration service 306, or other services, may access the device registry to retrieve information relating to a premises and to ensure that the appropriate devices are being configured. As devices are added to a premises or taken away from a premises, the device registry 308 may be updated.

The configuration service 306 may be in communication with an authentication, authorization, and accounting (AAA) server 310 or similar device to manage entitlements, security, and account management relating to a particular security system, premises, and/or user. The AAA server 310 may be in communication with the device registry 308 to manage access and entitlements to the premise devices 302 on a device-by-device basis. For example, a user may request access to video segments captured by a particular premise device 302 at a particular premises. As such, the AAA server 310 may be accessed to authenticate a user or device associated with the user and to facilitate selective access to the premises device 302 based on entitlements stored on the AAA server.

A control service 312 may comprise hardware and/or software configured to facilitate the dynamic operation of one or more of the premises device 302. The control service 312 may control the activation of one or more of the premises devices 302 to capture video of at least a portion of the premises. The control service 312 may cause one or more of the premises devices 302 to capture video in response to event rules such as motion detection, time schedules, sensor alarms, and the like. For example, event detection may include monitoring for movements within the premises and generating an alarm if certain movements are determined or not determined over a period of time. As a further example, the control service 312 may use facial recognition or other techniques to assess whether intruders are within the premises and may cause the premises devices 302 to activate in response to an intrusion event. Other event rules and control of the premises devices 302 may be implemented. Heuristic models and historical information may be relied upon to determine event rules.

In certain aspects, the functions of the control service 312 and the configuration service 306 may be provided by a single service via distinct logical components. In other aspects, the control service 312 and the configuration service 306 may relate to a unified logical element or implementation. Other physical and logical implementations may be used.

Various events may be tracked and an event log may be stored locally to the premises device 302 or remotely. The control service 312 may a destination path or address for the storage of event alerts. The control service 312 may implement a quiet interval, where the premise device 302 does not alert based on detected events. The sensitivity of event detection may be modified, for example, via hardware or software settings using the configuration service 306 and/or the control service 312. Additionally, or alternatively, sensitivity may be based on defined rules provided by the configuration service 306 and/or the control service 312 to govern the manner by which the premises device 302 detects and/or alerts a particular event. For example, motion detection may be detected based on a certain speed or magnitude of movement. As a further example, the alerting of such a detection may be triggered on a second threshold of increased magnitude. Various rules and thresholds may be used to manage the detection and alerting of the detection.

The control service 312 may be in communication with an event store to store information (e.g., event log manifest) relating to detected events. As an example, when an event is detected and video of the premises is captured, the control service 312 may store information relating to identification of a video segment and time markers (e.g., event manifest) relevant to the detected event. Such storage may be via any storage medium such as an event store 314. Subsequently, the video segments relating to the detected event may be retrieved based upon the identification of the video segment and time markers, as stored via the event store 314. In certain aspects, the event markers may be linked in a database to a storage location associated with one or more video segments associated with the detected event. As such, a request for a particular event marker may be linked to the video segment or segments associated with the underlying event.

With particular reference to FIG. 3B, the premises device 302 may be caused to activate and determine status information 318 associated with a premises. The status information 318 may comprise an alarm, a reminder, an intrusion detection, a motion detection, or a scheduled time, a combination thereof, or other information associated with a condition at or affecting the premises. The status information 318 may be transmitted via a network to a user or management service 303. A packet or transmission unit may be used to transmit the underlying status information 318 and may include a default marker 319a. As such, congestion on the network may inhibit the status information 318 from reaching the user on a timely basis due to latency or information loss. However, the status information 318 may be transmitted as a packet including a priority marker 319b indicating that the underlying payload should be processed with a high level of service (e.g., priority). Status information 318 bearing this priority marker 319b may be processed by network devices to minimize information loss and latency, while default traffic is processed with a lower level of service. Accordingly, conditions at the premises may be transmitted based on an importance of the particular condition. Conditional hierarchies and tables may be pre-determined for a particular premises, user, region, account, market, or may be applied at-large.

Figure 4:
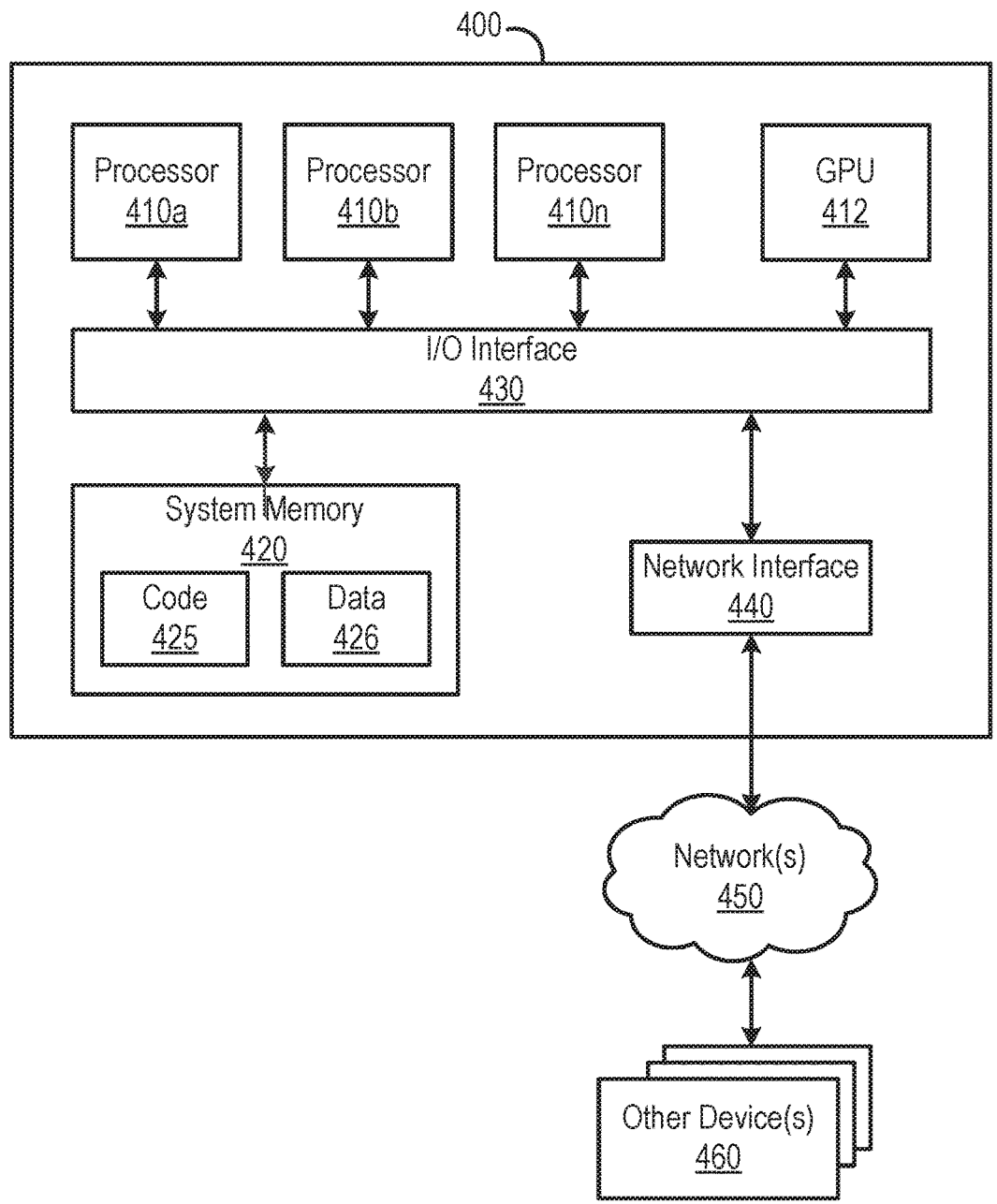
FIG. 4 is a block diagram of an example system and network.

The methods and systems may be implemented on a computing system, such as computing device 30 as shown in FIG. 2 and/or the devices and service described in relation to FIG. 3A, for example. Similarly, the methods and systems disclosed may utilize one or more computers to perform one or more functions in one or more locations. FIG. 4 depicts a general-purpose computer system that includes or is configured to access one or more computer-accessible media. In the aspect shown, a computing device 400 may include one or more processors 410a, 410b, and/or 410n (which may be referred herein singularly as the processor 410 or in the plural as the processors 410) coupled to a system memory 420 via an input/output (I/O) interface 430. The computing device 400 may further include a network interface 440 coupled to an I/O interface 430.

In various aspects, the computing device 400 may be a uniprocessor system including one processor 410 or a multiprocessor system including several processors 410 (e.g., two, four, eight, or another suitable number). The processors 410 may be any suitable processors capable of executing instructions. For example, in various aspects, the processor(s) 410 may be general-purpose or embedded processors implementing any of a variety of instruction set architectures (ISAs), such as the x86, PowerPC, SPARC, or MIPS ISAs, or any other suitable ISA. In multiprocessor systems, each of the processors 410 may commonly, but not necessarily, implement the same ISA.

In some aspects, a graphics processing unit ("GPU") 412 may participate in providing graphics rendering and/or physics processing capabilities. A GPU can, for example, include a highly parallelized processor architecture specialized for graphical computations. In some aspects, the processors 410 and the GPU 412 may be implemented as one or more of the same type of device.

The system memory 420 may be configured to store instructions and data accessible by the processor(s) 410. In various aspects, the system memory 420 may be implemented using any suitable memory technology, such as static random access memory ("SRAM"), synchronous dynamic RAM ("SDRAM"), nonvolatile/Flash®-type memory, or any other type of memory. In the aspect shown, program instructions and data implementing one or more desired functions, such as those methods, techniques and data described above, are shown stored within the system memory 420 as code 425 and data 426.

In one aspect, the I/O interface 430 may be configured to coordinate I/O traffic between the processor(s) 410, the system memory 420 and any peripherals in the device, including a network interface 440 or other peripheral interfaces. In some aspects, the I/O interface 430 may perform any necessary protocol, timing or other data transformations to convert data signals from one component (e.g., the system memory 420) into a format suitable for use by another component (e.g., the processor 410). In some aspects, the I/O interface 430 may include support for devices attached through various types of peripheral buses, such as a variant of the Peripheral Component Interconnect (PCI) bus standard or the Universal Serial Bus (USB) standard, for example. In some aspects, the function of the I/O interface 430 may be split into two or more separate components, such as a north bridge and a south bridge, for example. Also, in some aspects some or all of the functionality of the I/O interface 430, such as an interface to the system memory 420, may be incorporated directly into the processor 410.

The network interface 440 may be configured to allow data to be exchanged between the computing device 400 and other device or devices 460 attached to a network or networks 450, such as other computer systems or devices, for example. In various aspects, the network interface 440 may support communication via any suitable wired or wireless general data networks, such as types of Ethernet networks, for example. Additionally, the network interface 440 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 420 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 400 via the I/O interface 430. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 400 as the system memory 420 or another type of memory. Further, a computer-accessible medium may include transmission media or signals, such as electrical, electromagnetic or digital signals, conveyed via a communication medium, such as a network and/or a wireless link, such as those that may be implemented via the network interface 240. Portions or all of multiple computing devices, such as those shown in FIG. 4, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

Figure 5:
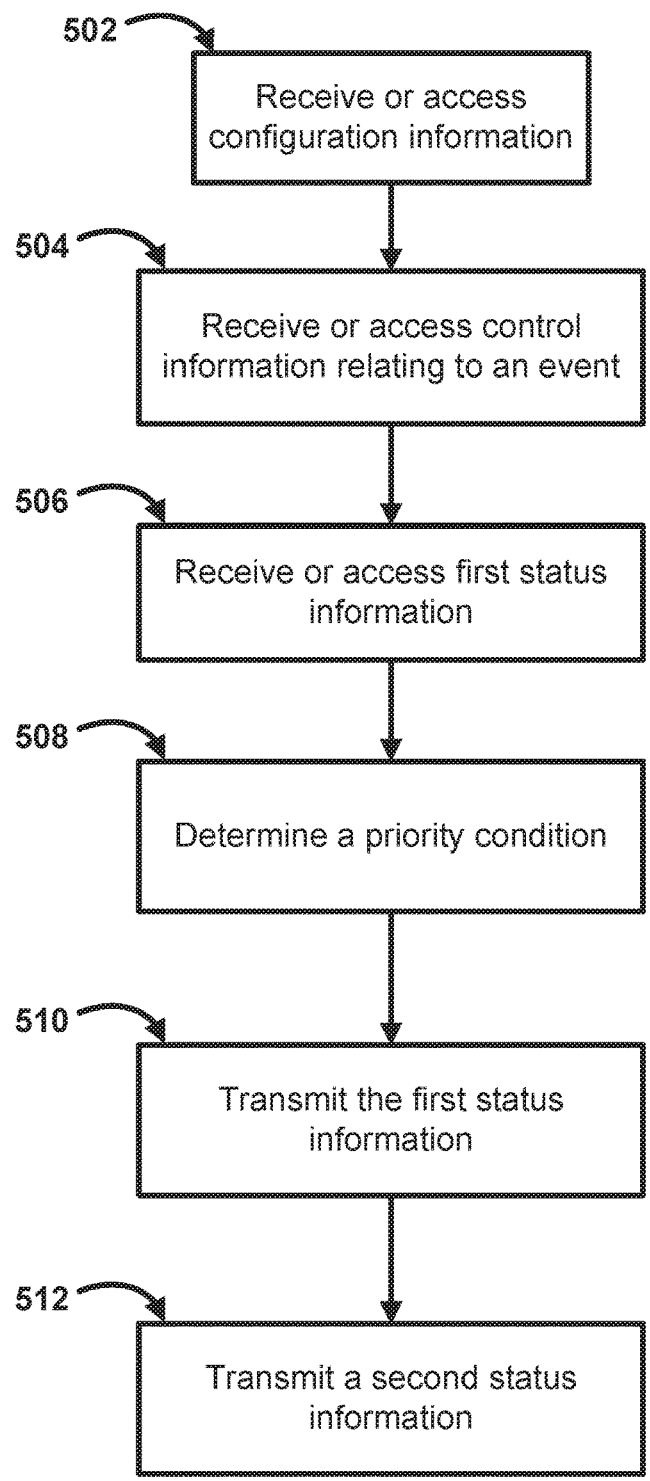
FIG. 5 is a flow chart of an example method.

An example method is shown in FIG. 5. In step 502, configuration information may be received or accessed, for example by the premises device 302 (FIG. 3A). The configuration information may comprise mapping information relating to a map of marker values (e.g., DSCP values) and conditions such as premises conditions, alarm conditions, non-alarm conditions, etc. The configuration information may comprise other settings such as activation of network video storage capability (e.g., cloud camera recording), video transmission frequency, and the like.

In step 504, control information may be received or accessed, for example by the premises device 302 (FIG. 3A). As an example, the control information may control the activation of one or more of the premises devices 302 to capture video of at least a portion of the premises. As another example, the control information may cause one or more of the premises devices 302 to activate (e.g., capture video, transmit status information, etc.) in response to event rules such as motion detection, time schedules, sensor alarms, and the like. For example, event detection may include monitoring for movements within the premises and generating an alarm if certain movements are determined or not determined over a period of time.

In step 506, first status information may be received or accessed by a device associated with a premises, for example by the premises device 302 (FIG. 3A). The device may be or comprise a network gateway, a sensor, a video camera, and the like. The first status information may comprise any information indicating a condition of the premises. The first status information may comprise audio, video, machine language, and/or alphanumeric characters. The first status information may be associated with an alarm, a reminder, an intrusion detection, a motion detection, or a scheduled time, or a combination thereof.

In step 508, a priority condition may be determined based at least on the first status information. Determining the priority condition may comprise applying one or more priority rules to at least the first status information. Implementation of priority rules may comprise a determination of a state of a premises management system or device. For example, information such as first status information may be transmitted as a normal or default condition when a premises management system is inactive or disarmed. Such information may be transmitted with high priority when the premises management system is determined to be armed or active. Priority rules may comprise specific condition thresholds such as time of day, state of device, time since last status transmission, state of associated devices and/or premises, and/or user configured rules. Such rules may be implemented to control how transmission from the premises devices and/or premises management system is managed.

Determining the priority condition may be based on the mapping information associated with marker values and related conditions. A marker value may be mapped with preset condition such as door/window alarms, fire alarm, alerts, motion detection, and/or a state of various sensors and/or device throughout a premises. One marker value may indicate a video camera has detected motion in a premises. Another marker value may indicate an outside light is illuminated. Various conditions and configurations may be mapped to various marker values. A marker value such as a DSCP value may indicate a level of network traffic processing priority. For example, a default marker value may be 000 000 and may indicate a best effort traffic management over a network. As such, a network device (e.g., router) may implement its best efforts to pass a packet with this default service level. As a further example, other marker values such as 101 110 may indicate a higher level of service as compared to the best effort. Such a higher level of service (e.g., priority condition) may include expedited forwarding or assured forwarding. Information (e.g., packets) marked with higher levels of service (e.g., priority) are more likely to be processed through a network device without packet loss during congestion, as compared to default level packets.

In step 510, the first status information may be transmitted including a first differentiated services code point indicative of the priority condition. The first differentiated services code point may be or comprise a value selected from a plurality of pre-determined values. Each of the plurality of values may indicate a specific priority condition that is distinct from another of the plurality of values.

In step 512, a second status information may be transmitted including a second differentiated services code point indicative of the normal condition. A normal condition may be a default condition, a non-alarm condition, a best efforts condition, and the like.

Figure 6:
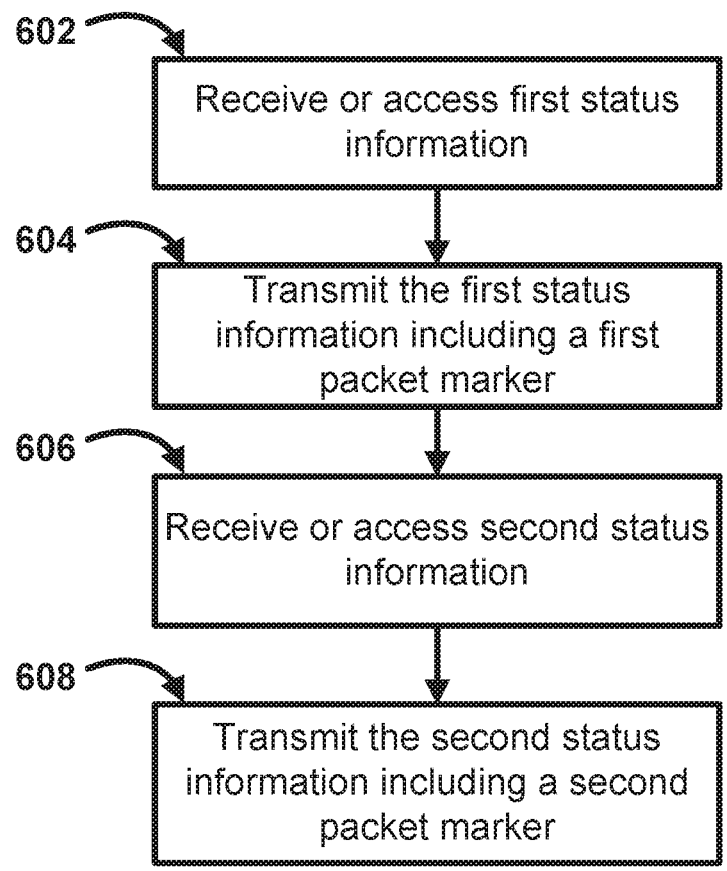
FIG. 6 is a flow chart of an example method.

An example method is shown in FIG. 6. In step 602, first status information may be received or accessed by a device associated with a premises, for example by the premises device 302 (FIG. 3A). The device may be or comprise a network gateway, a sensor, a video camera, and the like. The first status information may comprise any information indicating a first condition of the premises. The first status information may comprise audio, video, machine language, and/or alphanumeric characters. The first status information may be associated with an alarm, a reminder, an intrusion detection, a motion detection, or a scheduled time, or a combination thereof.

In step 604, the first status information may be transmitted including a first packet marker indicative of the first condition. The first status information may be transmitted via a network such as a packet network. The first packet marker may be or include a differentiated services code point. The first packet marker may be or comprise a value selected from a plurality of pre-determined values. Each of the plurality of values may indicate a specific priority condition that is distinct from another of the plurality of values.

In step 606, second status information may be received or accessed by a device associated with a premises, for example by the premises device 302 (FIG. 3A). The device may be or comprise a network gateway, a sensor, a video camera, and the like. The second status information may comprise any information indicating a second condition of the premises. The second status information may comprise audio, video, machine language, and/or alphanumeric characters. The second status information may be associated with an alarm, a reminder, an intrusion detection, a motion detection, or a scheduled time, or a combination thereof.

In step 608, the second status information may be transmitted including a second packet marker indicative of the second condition. The second status information may be transmitted via a network such as a packet network. The second packet marker may be or include a differentiated services code point. The second packet marker may be or comprise a value selected from a plurality of pre-determined values. Each of the plurality of values may indicate a specific priority condition that is distinct from another of the plurality of values. The first packet marker and the second packet marker may be configured to cause a recipient device to execute one or more operations based at least on the first packet marker and the second packet marker.

Figure 7:
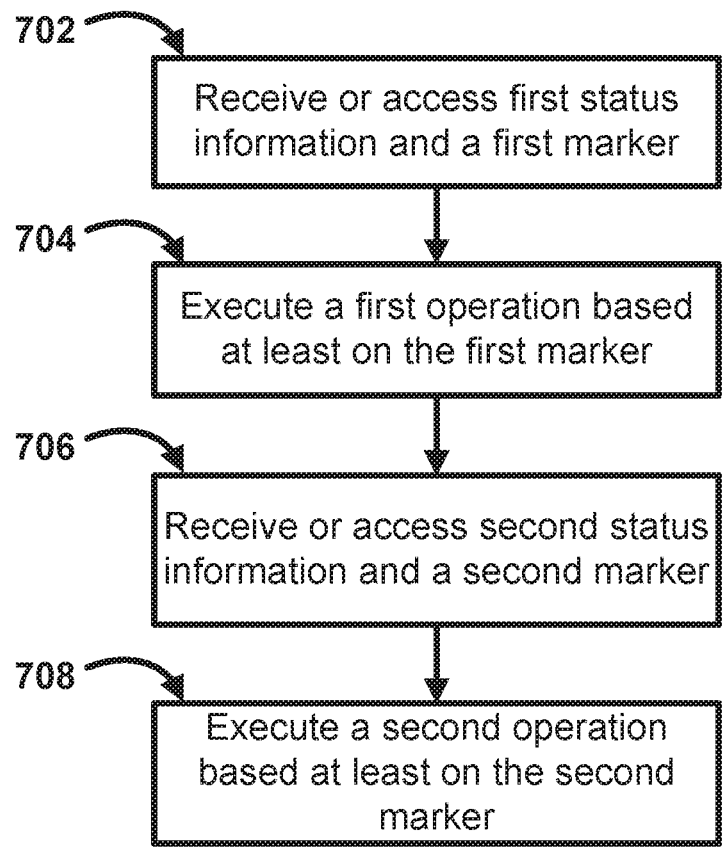
FIG. 7 is a flow chart of an example method.

An example method is shown in FIG. 7. In step 702, first status information including a first marker may be received or accessed by a device. The device may be or comprise a network device, for example. The first status information may comprise any information indicating a first condition of the premises. The first status information may comprise audio, video, machine language, and/or alphanumeric characters. The first status information may be associated with an alarm, a reminder, an intrusion detection, a motion detection, or a scheduled time, or a combination thereof.

In step 704, a first operation may be caused to be execute based at least on the first marker. As an example, a network device may receive or access the first marker and may process the first status information based at least on the first marker. The first marker may indicate that the first status information be processed under a best efforts service level or a priority service level, for example.

In step 706, second status information including a second marker may be received or accessed by a device. The device may be or comprise a network device, for example. The second status information may comprise any information indicating a second condition of the premises. The second status information may comprise audio, video, machine language, and/or alphanumeric characters. The second status information may be associated with an alarm, a reminder, an intrusion detection, a motion detection, or a scheduled time, or a combination thereof.

In step 708, a second operation may be caused to be execute based at least on the second marker. As an example, a network device may receive or access the second marker and may process the second status information based at least on the first marker. The second marker may indicate that the second status information be processed under a best efforts service level or a priority service level, for example.

Figure 8:
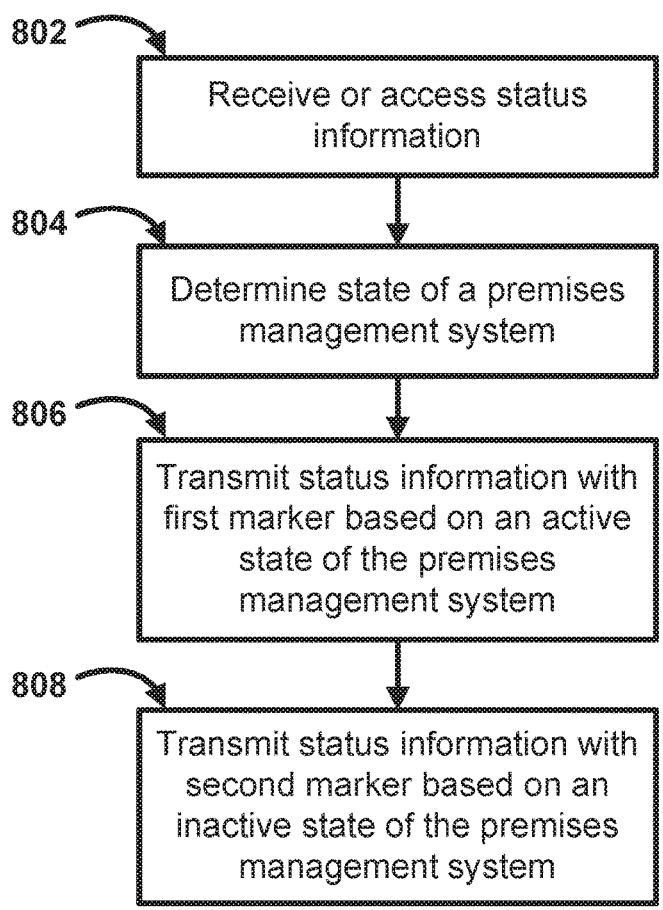
FIG. 8 is a flow chart of an example method.

An example method is shown in FIG. 8. In step 802, status information may be received or accessed by a device associated with a premises, for example by the premises device 302 (FIG. 3A). The device may be or comprise a network gateway, a sensor, a video camera, and the like. The device may be associated with a premises management system such as a sensor network, a security system, and/or home automation system. The status information may comprise any information indicating a condition of the premises. The status information may comprise audio, video, machine language, and/or alphanumeric characters. The status information may be associated with an alarm, a reminder, an intrusion detection, a motion detection, or a scheduled time, or a combination thereof. As an example, the status information may be associated with a particular priority level, which may further be prioritized based on additional information such as a state of a device or system. As a further example, a mapping of priority conditions and marker values may be used to indicate various conditions (and/or priority levels associated with such conditions) represented by the status information.

In step 804, a state of a premise management system may be determined. For example, the status information of step 802 may be associated with a premises management system such as a sensor network, a security system, and/or home automation system. The state of the premises management system may be active/armed and/or inactive/disarmed. The premises management system may have other states such as vacation mode, daytime mode, nighttime mode, etc. The state of the premises management system may be determined by receiving or accessing state information from a device (e.g., controller) associated with the premises management system.

In step 806, the status information or an indication of the status information may be transmitted with a first marker based at least on an active state of the premises management system. For example, in response to a determination of an active state of the premise management system, one or more first packets comprising a first packet marker may be transmitted. The one or more first packets may be associated with or indicative of the status information. The first packet marker may indicate a high priority condition such that the first packets are processed with higher priority than default packets. A default marker value may be 000 000 and may indicate a best effort traffic management over a network. As such, a network device (e.g., router) may implement its best efforts to pass a packet with this default service level. As a further example, other marker values such as 101 110 may indicate a higher level of service as compared to the best effort. Such a higher level of service (e.g., priority condition) may include expedited forwarding or assured forwarding. Information (e.g., packets) marked with higher levels of service (e.g., priority) are more likely to be processed through a network device without packet loss during congestion, as compared to default level packets.

In step 808, the status information or an indication of the status information may be transmitted with a second marker based at least on an inactive state of the premises management system. For example, in response to a determination of an inactive state of the premise management system, one or more second packets comprising a second packet marker may be transmitted. The one or more second packets may be associated with the status information. The second packet marker may indicate a normal priority condition. As such, a state of the premises management system may be used to determine a priority level for handling the transmission and/or processing of status information. For example, status information representing a motion detection may be transmitted as normal priority when a premises system is disarmed but the same motion detection information may be transmitted and/or processed with high priority when the premises management system is armed.

While the methods and systems have been described in connection with preferred embodiments and specific examples, it is not intended that the scope be limited to the particular embodiments set forth, as the embodiments herein are intended in all respects to be examples rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Example" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

It will be apparent to those skilled in the art that various modifications and variations may be made without departing from the scope or spirit. Other embodiments will be apparent to those skilled in the art from consideration of the specification and practice disclosed herein. It is intended that the specification be considered examples, with a true scope and spirit being indicated by the following claims.

The invention claimed is:

1. A system comprising:
one or more premises management devices associated with a premises; and
a computing device in communication with the one or more premises management devices, the computing device configured to:
determine, based on status information indicating a condition at the premises, a state of a premises management system associated with one or more of the computing device or the one or more premises management devices,
in response to a determination of an active state of the premise management system, send one or more first packets comprising a first packet marker, the one or more first packets associated with the status information, wherein the first packet marker indicates a high priority condition such that transmission of the one or more first packets via one or more network devices is based on the high priority condition; and
in response to a determination of an inactive state of the premise management system, send one or more second packets comprising a second packet marker, the one or more second packets associated with the status information, wherein the second packet marker indicates a normal priority condition such that transmission of the one or more second packets via one or more network devices is based on the normal priority condition.

2. The system of claim 1, wherein the computing device comprises a network gateway.

3. The system of claim 1, wherein the one or more premises management devices are located at the premises and configured to capture live video of at least a portion of the premises.

4. The system of claim 1, wherein the condition is an alarm, a reminder, an intrusion detection, a motion detection, or a scheduled time, or a combination thereof.

5. The system of claim 1, wherein one or more of the first packet marker and the second packet marker comprise a differentiated services code point.

6. The system of claim 1, wherein one of the first packet marker and the second packet marker indicates the condition at the premises.

7. The system of claim 1, wherein the computing device is configured to receive the status information from the one or more of the premises management devices.

8. The system of claim 1, wherein the one or more of the computing device or one or more premises management devices are associated with one or more of home automation or security associated with the premises.

9. A non-transitory computer-readable medium storing instructions that, when executed, cause:
- determining a priority condition based at least on first status information associated with a premises;
- sending the first status information including a first differentiated services code point indicative of the priority condition; and
- sending second status information including a second differentiated services code point indicative of a normal condition.

10. The non-transitory computer-readable medium of claim 9, wherein the first status information is associated with home automation.

11. The non-transitory computer-readable medium of claim 9, wherein the first status information is associated with security of the premises.

12. The non-transitory computer-readable medium of claim 9, wherein the first status information is associated with an alarm, a reminder, an intrusion detection, a motion detection, or a scheduled time, or a combination thereof.

13. The non-transitory computer-readable medium of claim 9, wherein the determining the priority condition comprises applying one or more priority rules to at least the first status information.

14. The non-transitory computer-readable medium of claim 9, wherein the first differentiated services code point comprises a value selected from a plurality of pre-determined values, wherein each of the plurality of pre-determined values indicates a specific priority condition that is distinct from another of the plurality of values.

15. The non-transitory computer-readable medium of claim 9, wherein the second differentiated services code point comprises a best effort value.

16. A device comprising:
- one or more processors; and
- memory storing instructions that, when executed by the one or more processors, cause the device to:
  - send, via a packet network, one or more first packets associated with first status information indicating a first condition at a premises, the one or more first packets comprising a first packet marker indicative of the first condition; and
  - send, via the packet network, one or more second packets associated with second status information indicating a second condition at the premises, the one or more second packets comprising a second packet marker indicative of the second condition, wherein the first packet marker and the second packet marker are configured to cause a recipient device to execute one or more operations based at least on the first packet marker and the second packet marker such that the one or more first packets are managed with a different priority than the one or more second packet markers.

17. The device of claim 16, wherein one or more of the first status information or the second status information is associated with home automation.

18. The device of claim 16, wherein one or more of the first status information or the second status information is associated with security of the premises.

19. The device of claim 16, wherein one or more of the first condition and the second condition is an alarm, a reminder, an intrusion detection, a motion detection, or a scheduled time, or a combination thereof.

20. The device of claim 16, wherein one or more of the first packet marker and the second packet marker comprise a differentiated services code point.

* * * * *